(12) United States Patent
Mande et al.

(10) Patent No.: US 10,563,784 B2
(45) Date of Patent: Feb. 18, 2020

(54) PRESSURIZED FLUID SYSTEM INCLUDING AN AUTOMATIC BLEED VALUE ARRANGEMENT; COMPONENTS; AND, METHODS

(71) Applicant: Eaton Intelligent Power Limited, Dublin (IE)

(72) Inventors: Vishal Pramod Mande, Pune (IN); Aniket Pravin Pataskar, Pune (IN); Ashwin Mrityunjayagoud Patil, Pune (IN); Barry Benaway, Burbank, CA (US)

(73) Assignee: Eaton Intelligent Power Limited, Dublin (IE)

( * ) Notice: Subject to any disclaimer, the term of this patent is extended or adjusted under 35 U.S.C. 154(b) by 266 days.

(21) Appl. No.: 15/409,316

(22) Filed: Jan. 18, 2017

(65) Prior Publication Data

US 2017/0241558 A1    Aug. 24, 2017

(30) Foreign Application Priority Data

Feb. 24, 2016   (IN) .............................. 201611006414

(51) Int. Cl.
| | | |
|---|---|---|
| F16K 24/04 | (2006.01) |
| F16K 37/00 | (2006.01) |
| G01M 3/30 | (2006.01) |
| G01M 3/28 | (2006.01) |

(52) U.S. Cl.
CPC ............ *F16K 24/04* (2013.01); *F16K 37/005* (2013.01); *F16K 37/0091* (2013.01); *G01M 3/2807* (2013.01); *G01M 3/2815* (2013.01); *G01M 3/2876* (2013.01); *G01M 3/30* (2013.01)

(58) Field of Classification Search
CPC .... F16K 24/04; F16K 37/005; F16K 37/0091; G01M 3/30; G01M 3/2876; G01M 3/2807; G01M 3/2815
See application file for complete search history.

(56) References Cited

U.S. PATENT DOCUMENTS

| | | |
|---|---|---|
| 3,081,788 A | 3/1963 | Lewis |
| 4,524,793 A | 6/1985 | Silverwater |
| 4,813,446 A | 3/1989 | Silverwater et al. |
| 5,211,200 A | 5/1993 | Cassidy |
| 5,305,793 A | 4/1994 | Cencula |
| 6,119,661 A | 9/2000 | DeLand et al. |
| 8,272,398 B2 | 9/2012 | Erdmann |
| 8,333,217 B2 | 12/2012 | Raper et al. |

(Continued)

FOREIGN PATENT DOCUMENTS

| | | |
|---|---|---|
| AT | 309 738 | 8/1973 |
| WO | 2009095780 A2 | 8/2009 |

(Continued)

*Primary Examiner* — Paul M. West
(74) *Attorney, Agent, or Firm* — Merchant & Gould P.C.

(57) ABSTRACT

Aspects and techniques of the present disclosure relate to a process of evaluating a pressurized fluid system including an automatic bleed valve arrangement therein for undesirable air leakage by diagnostically operating the automatic bleed valve arrangement. The disclosure also relates to methods of evaluating air presence in a pressurized fluid system sufficient to warrant bleed valve operation. Further, apparatus and features thereof are characterized.

21 Claims, 11 Drawing Sheets

(56) References Cited

U.S. PATENT DOCUMENTS

| | | |
|---|---|---|
| 8,439,065 B2 | 5/2013 | Dirkin et al. |
| 8,833,695 B2 | 9/2014 | Dhuri et al. |
| 2009/0293965 A1 | 12/2009 | Raper et al. |
| 2010/0319791 A1 | 12/2010 | Dirkin et al. |
| 2011/0072881 A1* | 3/2011 | Witt ................... F16K 24/04 73/19.05 |
| 2013/0092266 A1 | 4/2013 | Dhuri et al. |

FOREIGN PATENT DOCUMENTS

| | | |
|---|---|---|
| WO | WO 2009/095780 A2 | 8/2009 |
| WO | 2016138309 A1 | 9/2016 |

* cited by examiner

PRESSURIZED FLUID SYSTEM INCLUDING AN AUTOMATIC BLEED VALUE ARRANGEMENT; COMPONENTS; AND, METHODS

CROSS REFERENCE TO RELATED APPLICATIONS

This application claims the benefit of Indian Provisional Patent Application No. 201611006414, filed Feb. 24, 2016, which application is hereby incorporated by reference in its entirety.

TECHNICAL FIELD

The present disclosure relates generally to evaluating a pressurized fluid system for undesirable air leakage that can cause air entrapment in the pressurized fluid system. An example is described in the context of a hydraulic system including an automatic bleed valve. Principles applicable to bleed valve arrangements are disclosed which can be applied to a pressurized fluid system by using retrofit components.

BACKGROUND

In many fluid systems, fluids of different specific gravity collect. It is sometimes desirable to bleed a fluid of a first, lower, specific gravity from a fluid of a second, higher, specific gravity, from the fluid system. Many fluid systems are configured for managing air in a liquid system, where the air is the fluid of lower, specific gravity and the liquid is the fluid of higher, specific gravity. A typical example would be separating air from a hydraulic fluid or similar liquid.

Many bleed valve arrangements have been designed to manage the amount of air present in a liquid system. For example, air bleed valves are used in pressurized fluid systems, such as, hydraulic systems, to remove unwanted air. Air presence in such systems is detrimental because it can cause cavitation in pumps, oxidation, foaming, and/or reduced bulk modulus. Example bleed valves are shown in U.S. Pat. Nos. 8,833,695 and 8,272,398. The complete disclosures of these references are incorporated herein by reference.

Improvements in assembly and use of automatic bleed valve arrangements in such systems, are desirable.

SUMMARY

Bleed valve arrangements and features thereof are described. Also described are methods of assembly and use.

One aspect of the present disclosure relates to methods and techniques of evaluating a pressurized fluid system, for example, a hydraulic system, including an automatic bleed valve arrangement therein, for undesirable air leakage that can cause air entrapment in the pressurized fluid system, by diagnostically operating the automatic bleed valve arrangement. The disclosure also relates to methods of evaluating and confirming air presence in a pressurized fluid system sufficient to warrant bleed valve operation. These techniques can be advantageously used together, but they can be used separately.

Another aspect of the present disclosure relates to an improved automatic bleed valve arrangement that provides an air tight arrangement to reduce the amount of air leakage in a pressurized fluid system; and features thereof are characterized.

An automatic bleed valve arrangement is provided that generally comprises a housing having an inlet port and a bleed chamber. In example arrangements depicted, the housing includes a fluid level detector in the bleed chamber to detect a selected fluid level therein, typically a level of a fluid of higher specific gravity. The housing also includes a fluid bleed conduit that allows a fluid of lower specific gravity to flow from the bleed chamber to a solenoid valve upon detection of excess fluid of lower specific gravity in the bleed chamber. A retro fit threaded adapter is mounted on the housing to facilitate mounting the automatic bleed valve arrangement in a desired orientation.

DETAILED DESCRIPTION

I. Pressurized Fluid System Including an Automatic Bleed Valve Arrangement in Accordance with the Present Disclosure

Figure 1:
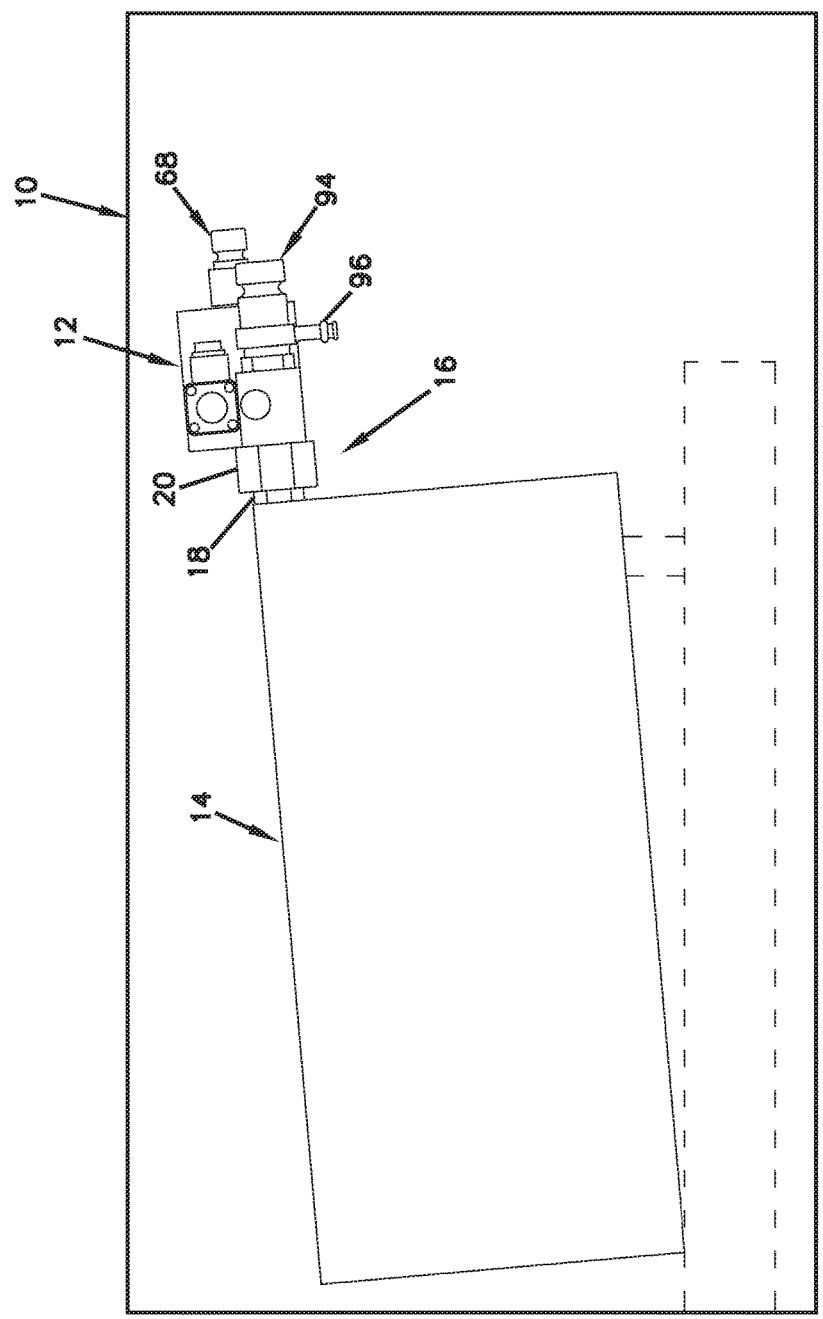
FIG. 1 is a schematic view of an example automatic bleed valve arrangement mounted on a pressurized fluid system in accord with the principles of the present disclosure.
Figure 2:
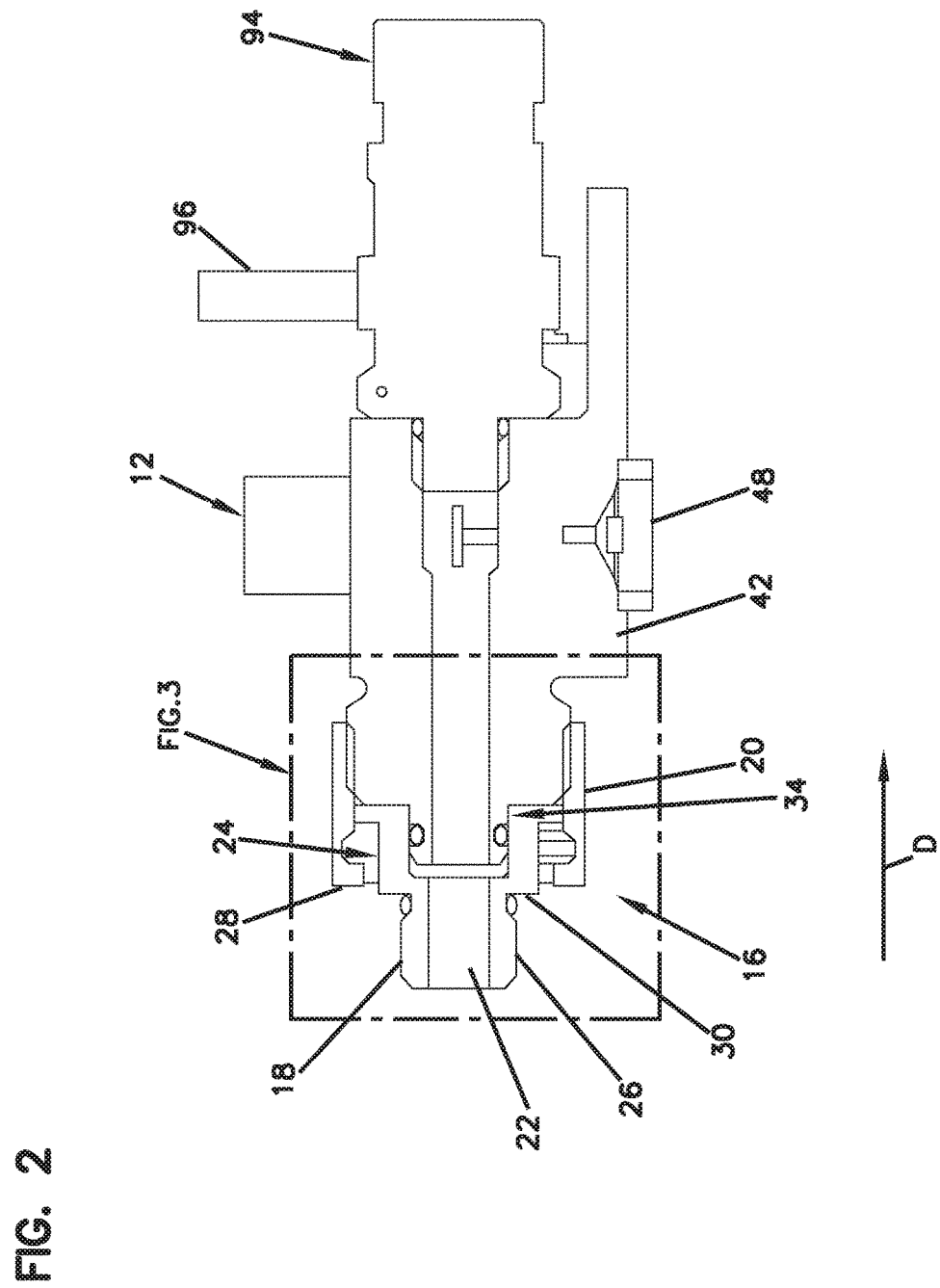
FIG. 2 is a schematic, partially, cross-sectional view of the automatic bleed valve arrangement shown in FIG. 1 depicting an adapter in accord with the principles of the present disclosure.
Figure 3:
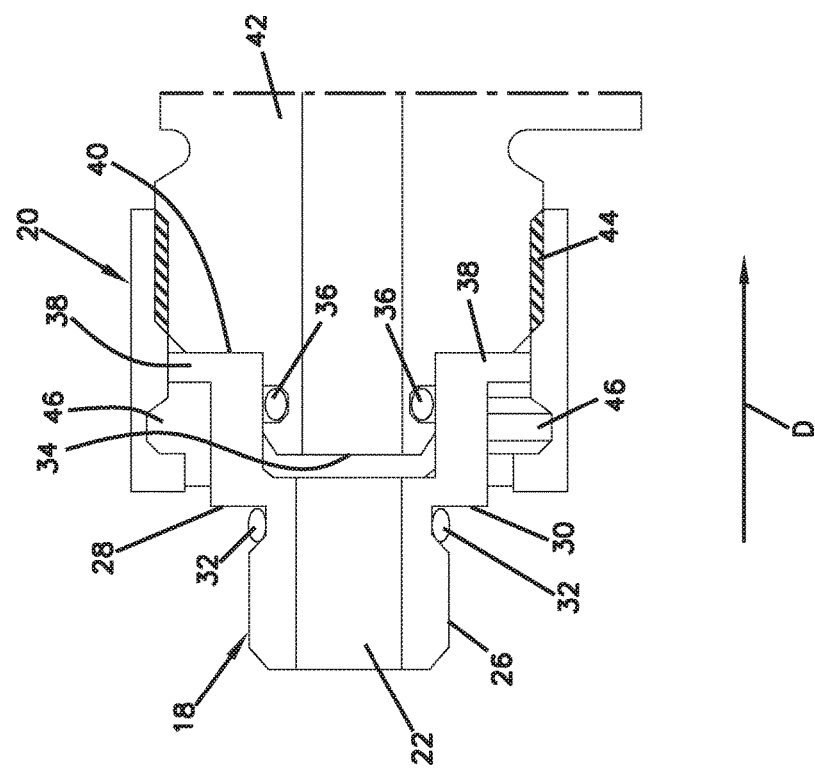
FIG. 3 is an enlarged fragmentary view of a portion of the automatic bleed valve arrangement of FIG. 2.

A. Properly Orienting an Automatic Bleed Valve Arrangement in an Example Pressurized Fluid System; FIGS. 1-3

A feature of the present disclosure relates to an optional threaded adapter for retrofitting an automatic bleed valve arrangement to a new or existing pressurized fluid system. The retro fit threaded adapter is optionally mounted on the housing to facilitate mounting the automatic bleed valve arrangement in a desired orientation.

An example pressurized fluid system 10, for example, a hydraulic system, is depicted in FIG. 1. This pressurized fluid system 10 includes an automatic bleed valve arrangement 12 (e.g., bleed valve apparatus), a reservoir 14, and an adapter 16. The adapter 16 may be threaded to mount the automatic bleed valve arrangement 12 to the reservoir 14, although alternatives are possible.

Referring now to FIGS. 2-3, the adapter 16 includes: an inner sleeve 18 (e.g., a first coupler) having a first threaded connection; and, a fitting nut 20 (e.g., a second coupler) having a second threaded connection, although alternatives are possible. The fitting nut 20 is rotatable relative to the inner sleeve 18. Such rotation between the inner sleeve 18 and the fitting nut 20 is possible prior to tightening. In the example depicted, the first threaded connection of the inner sleeve 18 is to the pressurized fluid system 10 and the second threaded connection of the fitting nut 20 is to the automatic bleed valve arrangement 12. The adapter 16 is arranged and configured to allow the automatic bleed valve arrangement 12 to retrofit to existing equipment or new systems with a threaded mount.

An outer surface of the inner sleeve 18 includes male threads that are threadably connected to female threads on the reservoir 14. The inner sleeve 18 of the adapter 16 may be formed from a known material such as aluminum or on aluminum alloy or the like, and which has a cylindrical bore 22 that is configured to engage an opening of the reservoir 14 and permit fluid flow between the reservoir 14 and the automatic bleed valve arrangement 12. The inner sleeve 18 can act as a threaded connection that is mounted between the reservoir 14 and the automatic bleed valve arrangement 12.

The inner sleeve 18 can have a first portion 24 of greater cross-dimension than a longitudinal second portion 26, thus providing a first shoulder 28 and second shoulder 30. The first portion 24 of the inner sleeve 18 includes a flange 38 that engages a surface 40 of the automatic bleed valve arrangement 12 when mounted and in an open position. The longitudinal second portion 26 has a threaded fit into an opening of the reservoir 14. The first portion 24 of the inner sleeve 18 can be press fitted over a port 34 of the automatic bleed valve arrangement 12.

First annular seals 32 or O-rings on the longitudinal second portion 26 may provide a close fit with the reservoir 14. Second annular seals 36 on the first portion 24 provide a close fit with the port 34 of the automatic bleed valve arrangement 12. The first and second annular seals 32, 36 can be made from an elastomeric material.

The fitting nut 20 can be secured on a housing 42 of the automatic bleed valve arrangement 12. In one example, the fitting nut 20 includes internal threads to mount over external threads 44 of the housing 42. When the adapter 16 is moved to a closed position, the fitting nut 20 slidably moves in a direction D over the housing 42 until the flange 38 of the inner sleeve 18 engages recesses 46 defined by the fitting nut 20. The fitting nut 20 is then threadably fastened to the housing 42 to secure the adapter 16.

Typically, the housing 42 can be configured and positioned in use, such that a mounting axis 70 thereof extends horizontally or coaxially with the inlet port 54. The inner sleeve 18 and fitting nut 20 can be arranged and configured to orient the automatic bleed valve arrangement in a specific rotational orientation as the inner sleeve 18 and fitting nut 20 are tightened.

Although alternatives are possible, the housing 42 will typically be formed from metal, such as, for example, aluminum. When made from metal, other metals, such as steel, lead, zinc, and tin (or alloys) may be used in some instances. Of course, other materials are possible, such as, a polymer material.

B. An Example Automatic Bleed Valve Arrangement; FIGS. 4-9

Another feature of the present disclosure relates to equipment, features, and methods for evaluating a pressurized fluid system 10, for example, hydraulic system, for undesirable air leakage that can cause air entrapment in the pressurized fluid system 10 by diagnostically operating an automatic bleed valve arrangement 12 associated with the pressurized fluid system 10. An example hydraulic system can be an aircraft system, although alternatives are possible. The diagnosis can be conducted on a pressurized fluid system 10 that has the adapter 16, but alternative applications are possible.

The pressurized fluid system 10 includes the automatic bleed valve arrangement 12 and a control arrangement 64 (e.g., chip systems, printed circuit boards, electronic components now known or later developed) in association with the automatic bleed valve arrangement 12. The control arrangement 64 can include an automatic bleed valve diagnostic operation control arrangement 65. The pressurized fluid system 10 may also include an air presence confirmation arrangement 67 that is operated to confirm, after a first determination of air presence sufficient to warrant venting, that a sufficient amount of air in the pressurized fluid system 10 actually warrants venting. The air presence confirmation arrangement 67 helps to avoid a false determination of an undesirable level of air in the pressurized fluid system 10 by a first determination of air presence.

There can be two general ways to detect air presence. One way is to directly measure for air in the system. Another way is to directly measure a level of the liquid in the system and if the liquid is below a predetermined level, conclude the amount of air presence. In the example, air is a fluid of first, lower, specific gravity and liquid is a fluid of a second, higher, specific gravity. Of course, alternatives are possible.

The pressurized fluid system 10 includes an air presence check arrangement 69 that is operated to conduct a first check for a sufficient amount of air in the automatic bleed valve arrangement to warrant venting. The air presence confirmation arrangement 67 conducts, after the first check indicates a sufficient amount of air in the automatic bleed valve arrangement 12 to warrant venting, a second check for a sufficient amount of air in the automatic bleed valve arrangement 12 to warrant venting. The air presence confirmation arrangement 67 is arranged and configured to conduct the second check within a selected period of time $T_s$ from the first check.

As used herein, the term, "a selected period of time $T_s$," and variants thereof, in this context, without more, means a time sufficient for the second check to confirm the indication of the first check that there is a sufficient amount of air, and thus to avoid the first check being interpreted falsely as a positive indication of a sufficient amount of air prior to opening the automatic bleed valve arrangement 12. Furthermore, in this context, the term, "a selected period of time $T_s$," without more, means a time period in which, after the first check, the second check of confirmation is complete.

The air presence confirmation arrangement 67 conducts (i.e., is operated to conduct) the second check of confirmation intermittently through the selected period of time $T_s$, although alternatives are possible. For example, the air presence confirmation arrangement 67 conducts the second check of confirmation continuously through the selected period of time $T_s$. The air presence confirmation arrangement 67 conducts the second check of confirmation only once during selected period of time $T_s$ Preferably the air presence confirmation arrangement 67 conducts the second check of confirmation continuously after the first check for the selected period of time $T_s$. Preferably the air presence confirmation arrangement 67 conducts the second check of confirmation within the selected period of time $T_s$ that is at least 1 second and no more than 4 seconds.

The control arrangement 64 is arranged and configured to evaluate the pressurized fluid system 10 for undesirable air leakage that can cause air entrapment in the pressurized fluid system 10 by diagnostically operating the automatic bleed valve arrangement 12. In one example, the control arrangement 64 can evaluate for an amount of air released from the pressurized fluid system 10 by operation of the automatic bleed valve arrangement 12.

The pressurized fluid system 10 can include an initial vent controller 71 to vent air through the automatic bleed valve arrangement 12 and an undesirable amount of air detection controller 73 to determine whether an undesirable amount of air remains in the pressurized fluid system 10 after the initial vent controller 71 vents air through the automatic bleed valve arrangement 12. The undesirable amount of air detection controller 73 determines whether an undesirable amount of air remains in the pressurized fluid system 10 within a selected time period $T_a$ of the initial vent controller 71 having completed the vent of the automatic bleed valve arrangement 12.

As used herein, the term, "a selected time period $T_a$" and variants thereof, in this context, without more, means a time within which an indication of an undesirable amount of air in the pressurized fluid system 10, after the vent of the automatic bleed valve arrangement 12, is indicative of an undesired leak in the pressurized fluid system 10. Furthermore, in this context, the term, "a selected period of time $T_a$," without more, means a time period in which the venting is initiated after determining and confirming that undesirable amounts of air remains in the pressurized fluid system 10.

The initial vent controller 71 is adapted to open the automatic bleed valve arrangement 12 to vent air through the automatic bleed valve 12, for a predetermined time $T_n$ and to close the automatic bleed valve arrangement 12 after the predetermined time $T_n$ has ended.

As used herein, the term, "a selected period of time $T_n$," and variants thereof, in this context, without more, means a time sufficient to selectively vent a desired amount of air accumulated within the pressurized fluid system 10 when properly operating. Furthermore, in this context, the term, "a selected period of time $T_n$," without more, means a time period appropriate to vent sufficiently in the absence of leaking for the air presence check arrangement 69 to show venting has occurred, by detecting liquid presence. Furthermore, in this context, the term "a selected period of time $T_n$" is not meant to necessarily indicate, unless specifically stated, that all of the air is vented, but only that enough is vented such that the air presence check arrangement 69 no longer measures a need to vent.

Figure 4:
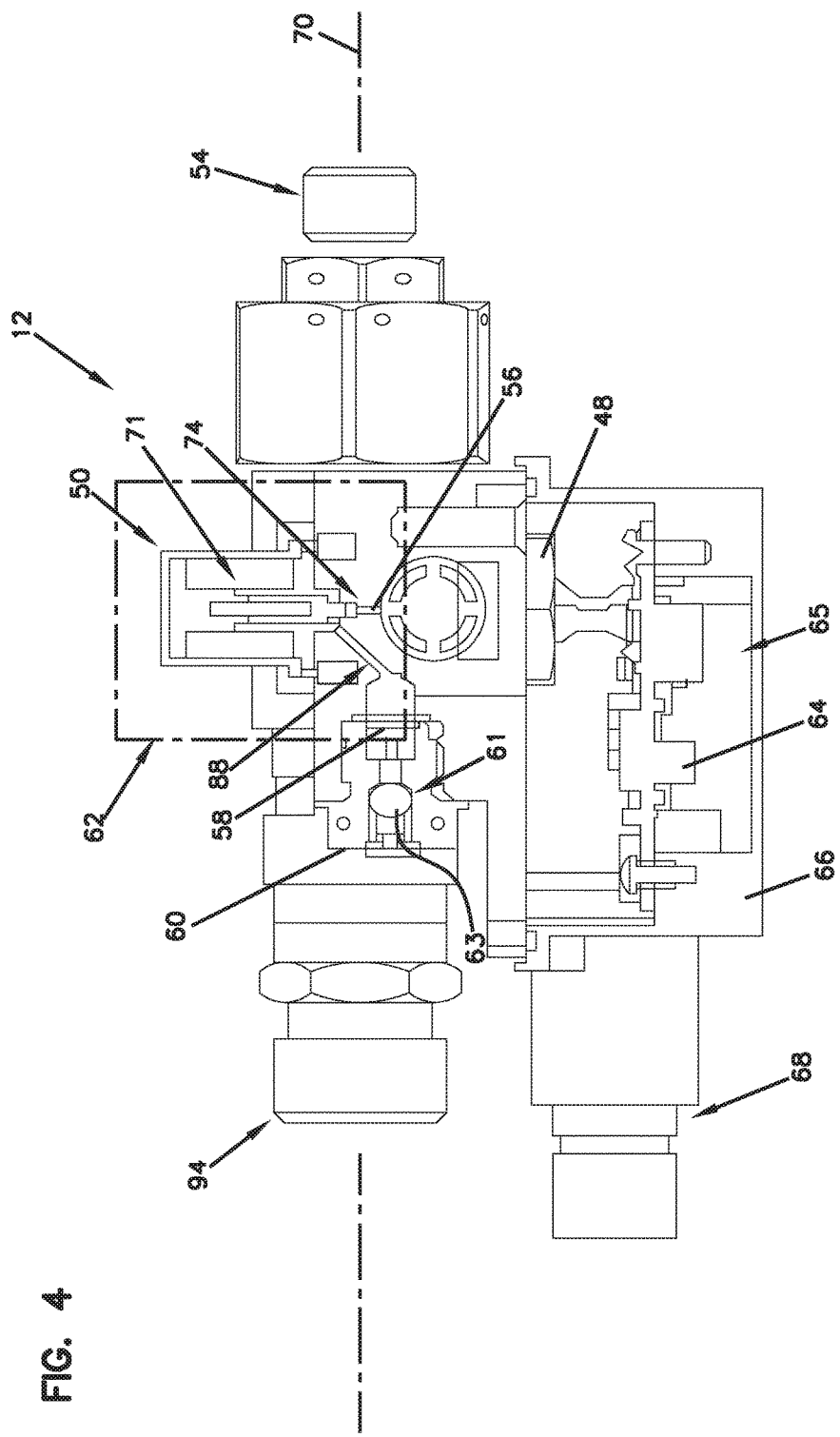
FIG. 4 is a schematic, partially exploded, cross-sectional view of the automatic bleed valve arrangement shown in FIG. 1.
Figure 5:
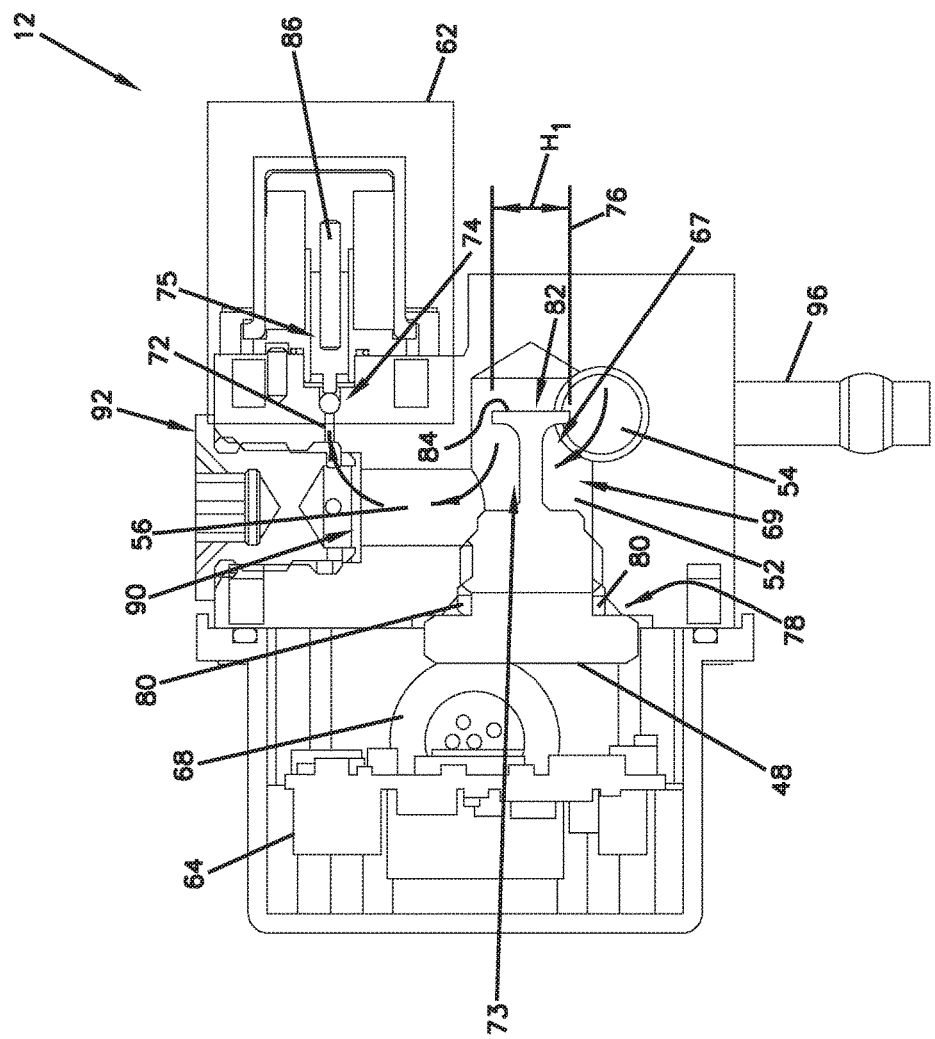
FIG. 5 is a schematic, partially, cross-sectional view of the automatic bleed valve arrangement shown in FIG. 4 depicting a fluid bleed conduit in accord with the principles of the present disclosure.

Referring to FIGS. 4-5 a schematic cross-sectional view of an example automatic bleed valve arrangement 12 is depicted.

The example automatic bleed valve arrangement 12 includes a liquid level sensor 48, a solenoid valve 50, a bleed chamber 52, an inlet port 54, a fluid bleed conduit 56, typically, an air bleed conduit, a restrictor 58, and a protection mechanism 60 (e.g., vent membrane). The automatic bleed valve arrangement 12 further includes a control arrangement 64 (e.g., electronic control mechanism) positioned within a control housing 66, and an electrical connector 68 (e.g., power supply connector).

In use, this automatic bleed valve arrangement 12 would be mounted in flow communication with an appropriate, typically upper, portion of a tank of a fluid system, typically under pressure, for example the pressurized fluid system 10, to receive liquid flow from the fluid system through the inlet port 54. Over time, air trapped in the fluid system would also enter the automatic bleed valve arrangement 12 through the inlet port 54 and into the bleed chamber 52. The function of the automatic bleed valve arrangement 12 is to selectively bleed this air from the pressurized fluid system 10 with minimal discharge of the liquid.

The example automatic bleed valve arrangement 12 shown provides for flow of a fluid of a first, lower, specific gravity and a fluid of a second, higher, specific gravity from the reservoir 14 to the bleed chamber 52. In use, fluid enters the reservoir 14 and flows through the inlet port 54 to fill the bleed chamber 52. The difference between the fluid of the first, lower, specific gravity and the fluid of the second, higher, specific gravity is sufficient such that the fluids will separate in the environment of operation.

Once a fluid level in the bleed chamber 52 is down or falls below a selected level, typically a fluid of a first, lower, specific gravity will enter the bleed chamber 52. Over time, excess fluid of the first, lower, specific gravity, from the pressurized fluid system 10 on which the automatic bleed valve arrangement 12 is mounted will build up in the bleed chamber 52. In the example depicted, the fluid of lower specific gravity can be air, and the fluid of higher specific gravity can be liquid. Although the example depicted is an air/liquid system within an air bleed valve arrangement, associated with hydraulic liquid system, alternatives are possible.

In particular, the air bleed conduit 56 is in fluid communication with the bleed chamber 52 and the solenoid valve 50 (e.g., fluid vent valve). The liquid level sensor 48 is configured to detect when the liquid in the bleed chamber 52 has fallen below a pre-determined level, thus indicating an amount of excess air has been collected in the system that needs to be bled therefrom. The liquid level sensor 48 can be an optical sensor, or a contact sensor, for example. When the liquid level sensor 48 no longer detects the designated or selected liquid level, it sends a signal, for example through the control arrangement 64 to the solenoid valve 50 to open and allow the excess air to vent from the automatic bleed valve arrangement 12, for example, to the atmosphere.

Turning again to FIGS. 4-5, often, the solenoid valve 50 includes a valve seat 74 that is circular in cross-sectional shape, alternative shapes are possible. The valve seat 74 defines a fluid passage that extends therethrough where fluid flows. Generally, when excess air builds up in the bleed chamber 52, the liquid level sensor 48 can no longer detect the fluid as being at least at a selected fluid detection level 76. The liquid level sensor 48 sends a signal to allow the air to vent through the fluid bleed conduit 56, then through the valve seat 74, opened by the solenoid valve 50 and out to the atmosphere, although alternatives are possible. Once the fluid leaves the solenoid valve 50 it passes through a vent outlet 88, for example. The vent outlet 88 is depicted as a passage that allows fluid to pass therethrough. Because the automatic bleed valve arrangement 12 is under pressure of the pressurized fluid system 10 to which it is mounted, the internal pressure, often at least 60 pound-force per square inch (psi) or 414 kilopascal (kPa), (usually greater than 70 psi or 483 kPA), will very quickly vent the air from the automatic bleed valve arrangement 12.

The air bleed conduit 56 allows excess air to vent from the bleed chamber 52 through outlet 72 when a valve actuator 75 of the solenoid valve 50 is actuated, to open the valve seat 74 to allow air flow therethrough, by movement of a valve member 13 from the valve seat 74 in response to the signal from the liquid level sensor 48. The solenoid valve 50 closes (for example under spring pressure) once the liquid level rises sufficiently (i.e., after bleed). Because the pressurized fluid system is under internal pressure, the excess air is readily forced from the bleed chamber 52 and the automatic bleed valve arrangement 12 when the solenoid valve 50 opens.

In one example, the valve member 13 is made of an elastomeric material to provide an improved air tight seal for the solenoid valve 50 when in the closed position. In other examples, the valve member 13 may be made from a metallic material. In such an example, a replaceable gasket or seal (not shown) can be positioned adjacent the valve seat 74. The replaceable gasket or seal can include a material made of silicone or rubber-like material for providing an airtight, leakproof seal that is more resistant to air and liquid.

The air tight seal within the automatic bleed valve arrangement 12 helps to inhibit the leakage of air when the automatic bleed valve arrangement 12 is not powered on. With the help of the control arrangement 64, it can be seen for how much time the automatic bleed valve arrangement 12 was actuated and flow can be calculated. If the air accumulation rate is increased over time, there could be error messages generated by the control arrangement 64 and sent for further processing to next level systems. This can help quickly identify if an issue exists and its resolution before performance begins to degrade the system. The size of the valve member 13 is within the range of 0.05 inches to 0.09 inches. Typically, the size of the valve member 13 is 0.07 inches.

Typically, the solenoid valve 50 is a stepper motor, but it may be any other type of opening and closing valve whose state is electronically controlled.

The solenoid valve 50 remains closed, for example, under biasing pressure by a biasing arrangement 86 (e.g., a spring) until a signal is generated by the liquid level sensor 76 to cause it to open. In one example, the control arrangement 64 can be programmed or configured with the pre-determined time $T_n$ for which the solenoid valve 50 remains open to vent air sufficiently. At the end of the pre-determined time $T_n$ the solenoid valve 50 closes. Further details of the solenoid valve 50 operation are described with reference to FIGS. 6-9.

The example liquid level sensor 48 is shown mounted to the housing 42 to detect a level of fluid (typically of the higher specific gravity) in the bleed chamber 52. In certain examples, the liquid level sensor 48 may be an optical sensor that uses a photoelectric sensor such as a phototransistor and light emitting diodes LEDs to detect the level of fluid within the bleed chamber 52. Of course, different types of fluid level sensing systems may be used, for example, fluid contact sensors (i.e., acoustic wave sensors). Typically, the liquid level sensor 48 is mounted or inserted in a bleed chamber end 78 to seal or close off the bleed chamber 52 with seal 80, alternatives are possible.

The example liquid level sensor 48 depicted has a frontal face portion 82. Although alternatives are possible, the frontal face portion 82, of the example, has a planar surface 84 provided to detect a selected fluid detection level 76 in the bleed chamber 52. Typically, when planar, the frontal face portion 82 of the liquid level sensor 48 is in a plane perpendicular to the mounting axis 70.

The term "selected fluid detection level" 76 as used herein, in this context, without more, refers to the level at, or below which, the liquid level sensor 48 is set to recognize that the level of fluid of higher specific gravity is low enough so that bleed of a fluid of lower specific gravity is desired, and/or at, or above which, the liquid level sensor 48 is set to recognize that the level of fluid of higher specific gravity is high enough so that bleed of a fluid of lower specific gravity is not desired.

Typically, the frontal face portion 82 of the liquid level sensor 48 has a dimension of (height) $H_1$, that is at least 2 mm (millimeters), although variations are possible. Often, the dimension of (height) $H_1$ is at least 10 mm, although alternatives are possible. Usually, the height $H_1$ is no more than 30 mm, although variations are possible.

In the depicted example, the dimension of (height) $H_1$ of the face portion 82 is at least 50% of a dimension across the bleed chamber 52, but alternatives are possible. Usually, the dimension of (height) $H_1$ of the face portion 82 is at least 70% across the bleed chamber 52, although alternatives are possible. Typically, the dimension of (height) $H_1$ of the face portion 82 is no more than 90% across the bleed chamber 52, although alternatives are possible.

When the fluid level detected falls below a selected level, as a result of fluid of lower specific gravity build-up in the housing 42, the fluid of lower specific gravity in the bleed chamber 52 can communicate with the fluid bleed conduit 56. The liquid level sensor 48, then, directs the valve actuator 75 of the solenoid valve 50 to open to let a fluid of lower specific gravity (i.e. the air) to vent: through the fluid bleed conduit 56; then through valve seat 74, opened by the solenoid valve 50, and outwardly from the housing 42. In due course, when sufficient bleed of a fluid of lower specific gravity has occurred, the solenoid valve 50 closes, as described above.

When the automatic bleed valve arrangement 12 is powered on, as air is sensed by the liquid level sensor 48, the solenoid valve 50 is actuated by voltage or current supply to open the solenoid valve 50. As per the control arrangement 64 (e.g., electronic control logic) along with sensor feedback of the presence of liquid (e.g., oil, etc.), the solenoid valve 50 is de-actuated by depleting the current/voltage and the solenoid valve 50 is closed. The signal may be immediate to inhibit any loss of liquid (e.g., oil) due to time taken in closure of the solenoid valve 50.

The example fluid bleed conduit 56 is in direct communication with the bleed chamber 52. Herein, the term "direct communication" is generally used to relate two features or components in a variety of situations. Specifically, the term "direct communication" is used to describe two features or components that are directly connected with nothing in-between them.

Typically the solenoid valve 50 is configured to communicate with the fluid bleed conduit 56 at a location remote from the bleed chamber 52. As depicted, the fluid bleed conduit 56 is in direct communication with the bleed chamber 52.

The solenoid valve 50 is operably connected to the controller 64. Typically, the example control arrangement 64 shown processes the signals from the liquid level sensor 76 and generates an activation signal that is sent to the solenoid valve 50 when the excess fluid of lower specific gravity, or air, if present in a sufficient quantity, can be vented out of the bleed chamber 52. The control arrangement 64 can also be programmed with a timed cycle to cause the solenoid valve 50 to close after a predetermined time $T_n$ period has passed.

Figure 6:
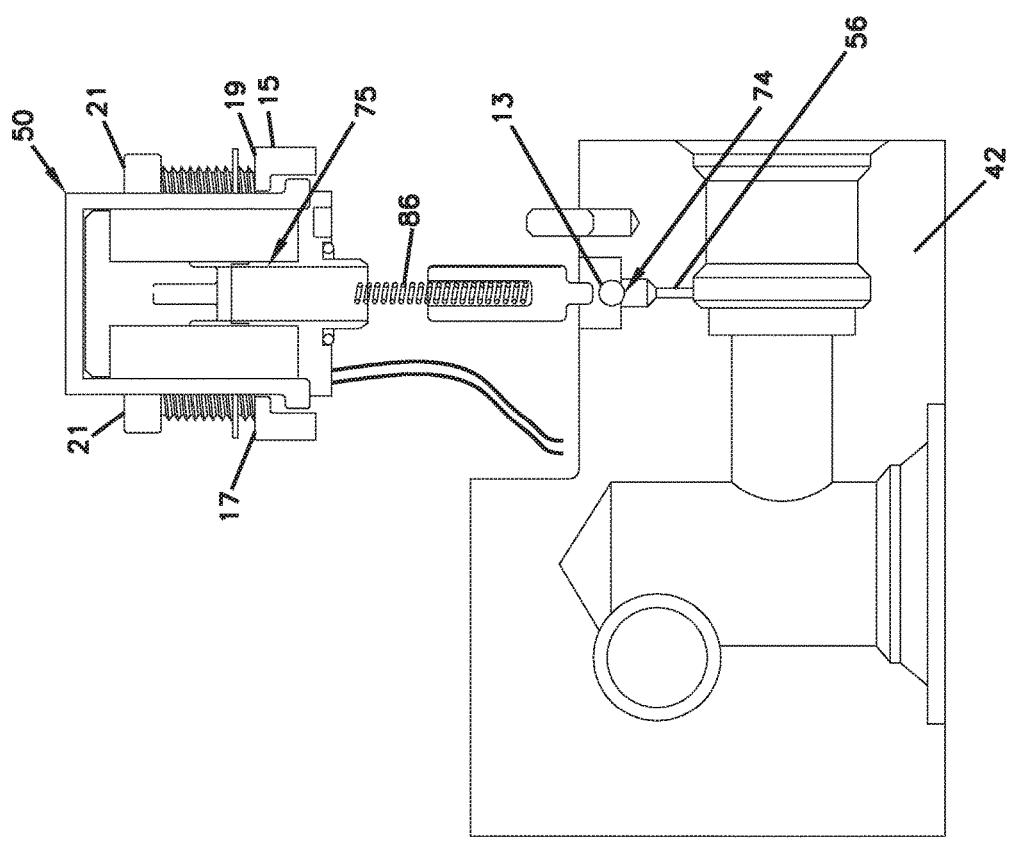
FIG. 6 is a schematic, exploded, cross-sectional view of a portion of the automatic bleed valve arrangement shown in FIG. 4.
Figure 7:
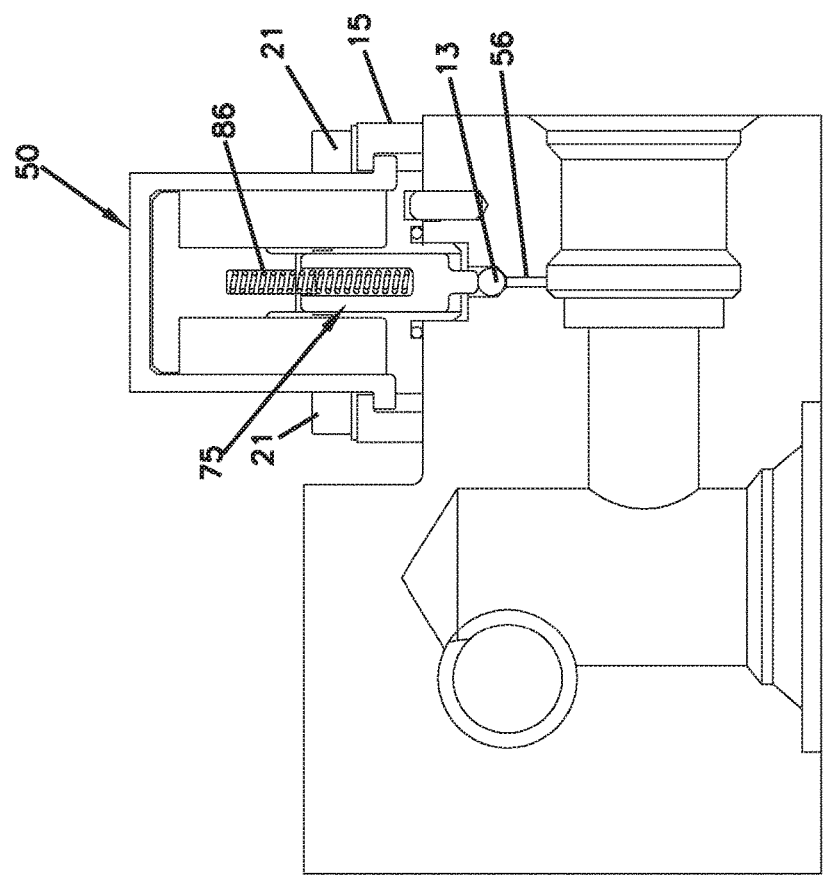
FIG. 7 is a schematic cross-sectional view of the automatic bleed valve arrangement shown in FIG. 6.

Referring to FIGS. 6-7, the solenoid valve 50 includes one or more mounting brackets 15 for securing the solenoid valve 50 to the housing 42. The mounting bracket 15 has generally a pair of flat end flange members 17, 19. The end flanges 17, 19 have openings (not shown), respectively, for securing the solenoid valve 50 to the housing 42 by fastener members, such as bolts 21 shown in FIGS. 6 and 7.

The restrictor 58 is sized to allow all the fluid to flow quickly, but to create enough pressure to inhibit fluid of higher specific gravity from passing through. In one example, the restrictor is a small sized hole that is arranged to prevent solids from passing through to the solenoid valve 50 by using a barrier screen. The restrictor 58 can have a hole size that is within a range of 0.0005 inches to 0.010 inches. The restrictor 58 includes a restrictor housing 60 that is threadably connected to the housing 42. When attached the restrictor housing 60 can crush or press fit the restrictor 58 positioned therein.

In one example, the restrictor housing 60 can include a vent membrane with features that allow fluid to flow freely in and out of the housing 42, which helps to prevent stress on seals. The restrictor housing 60 includes billions of micro-pores that serve as a barrier against water, dirt, and debris that can damage the internal electronics or clog the outlet 88 to the housing 42. Typically, the restrictor housing 60 equalizes the pressure and reduces condensation by allowing fluid to flow freely into and out of the housing 42. The restrictor 58 works as a fail-safe arrangement for the solenoid valve 50 if it becomes stuck in an open position. The restrictor 58 can reduce oil loss from the reservoir 14 so that it retains at least ⅔ of its volume.

The restrictor housing 60 includes a check valve 61 that is spring loaded. The check valve 61 includes a metallic ball 63 that lifts as air passes through and exits the system. The check valve 61 also functions to inhibit air from going inside of the housing 42.

Figure 8:
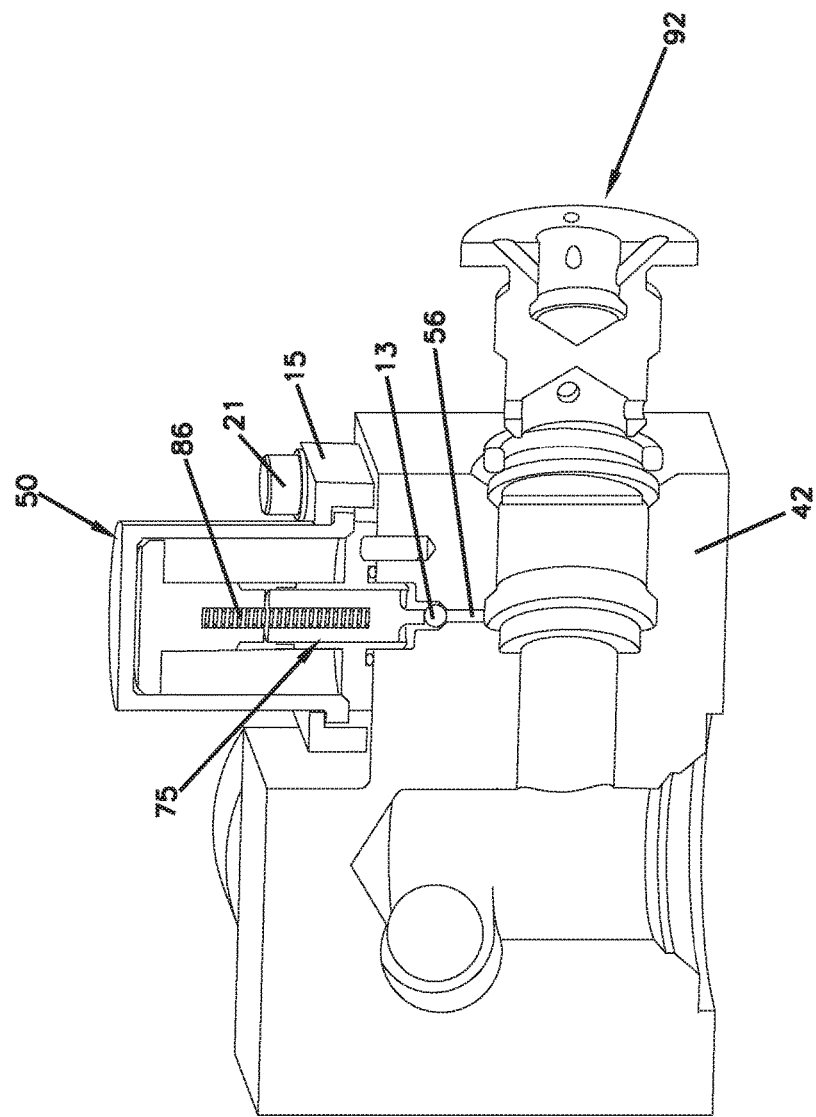
FIG. 8 is a schematic, partially exploded, cross-sectional view of the automatic bleed valve arrangement shown in FIG. 5 depicting a filter housing detached from the automatic bleed valve arrangement in accord with the principles of the present disclosure.
Figure 9:
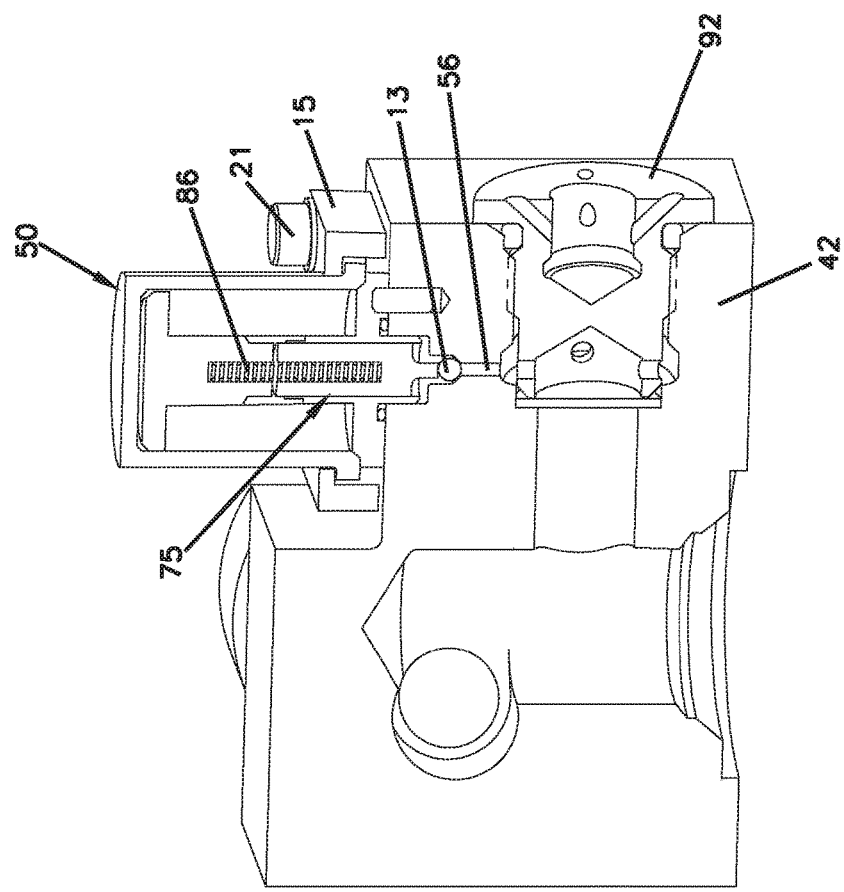
FIG. 9 is a schematic cross-sectional view of the automatic bleed valve arrangement shown in FIG. 8 depicting the filter housing attached to the automatic bleed valve arrangement.

Referring to FIGS. 8-9, a filter plug 90 (see FIG. 5) is positioned within a filter housing 92. The filter housing 92 can be threadably connected to the housing 42. The filter plug 90 helps to prevent damage to the valve member 13. The filter plug 90 can be a corrosion resistant steel wire that provides a barrier to solid debris to prevent particles from passing through. The filter plug 90 is configured to allow liquids to pass through. The filter plug 90 is crushed and secured within the filter housing 92.

Generally, the electrical connector 68 is the power supply to the system. The electrical connector 68 is configured to supply power to the liquid level sensor 76 and the solenoid valve 50.

Although alternatives are possible, the liquid level sensor 76 and the solenoid valve 50 electronics can be integrated into various packages or it can all be integrated into one package and connected to the electrical connector 68, as in the depicted example.

In certain examples, the automatic bleed valve arrangement 12 can include a manual bleed valve 94 (see FIGS. 1-2 and 4-5). The manual bleed valve 94 includes an outlet 96 that can be connected to an external hose or drainage pipe for. The manual bleed valve 94 can be used for purging air from the reservoir 14 at the time of refilling or when there is a failure in the function of the auto bleed. The Manual bleed valve 94 also protects the reservoir 14 from getting damaged when pressure increases beyond a set value. The outlet 96 is arranged and configured to swivel or rotate about an axis of the manual bleed valve 94.

Figure 10:
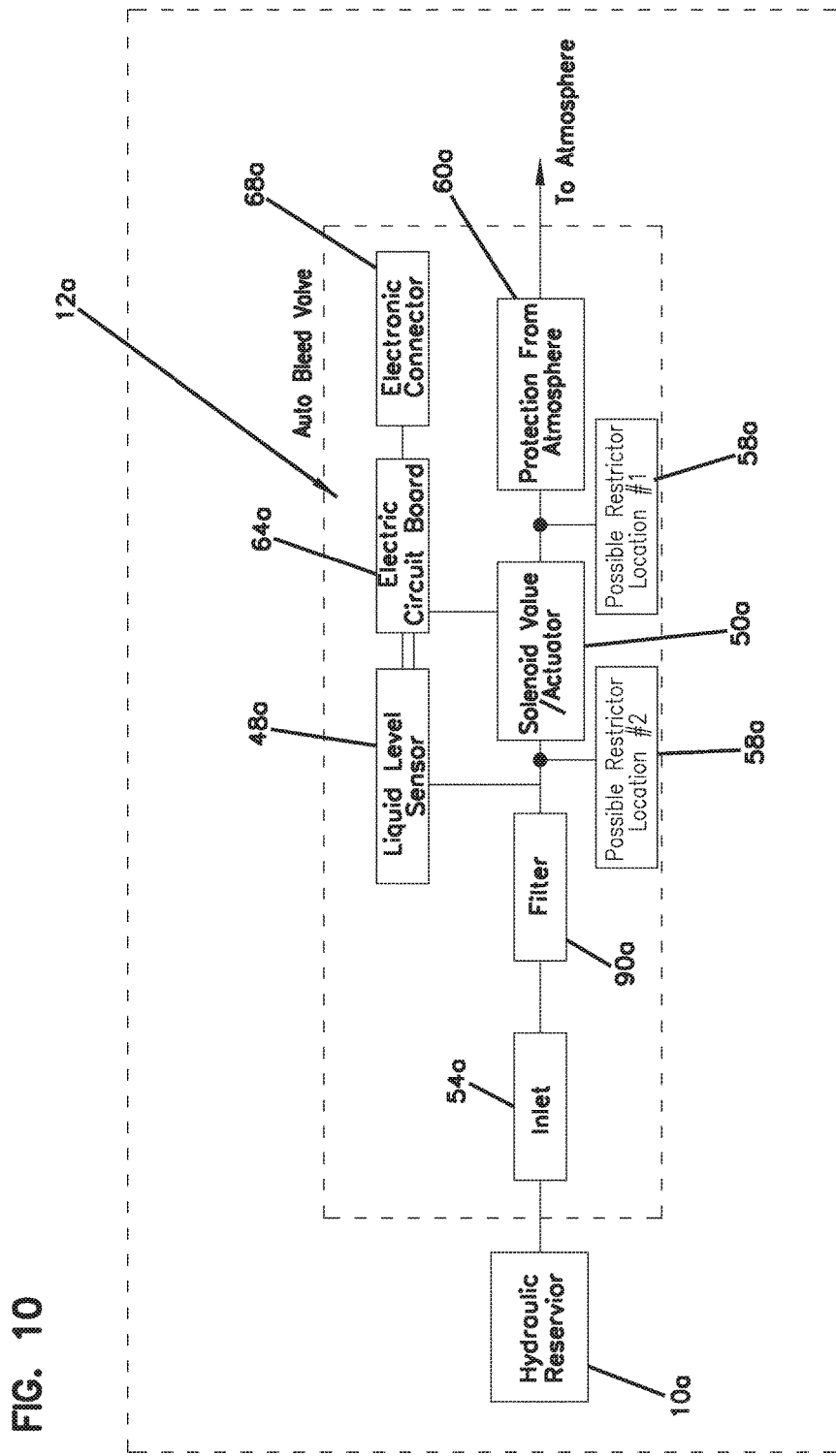
FIG. 10 is a schematic view of a generic system including an automatic bleed valve arrangement shown in accord with the principles of the present disclosure.

FIG. 10 is a schematic view generically showing a pressurized fluid system 10a with an automatic bleed valve arrangement 12a in accord with the present disclosure. The automatic bleed valve arrangement 12a is adapted to be mounted on a pressurized fluid system 10a, for example, a hydraulic system. The automatic bleed valve arrangement 12a optionally includes an inlet port 54a, a filter plug 90a, a liquid level sensor 48a, a controller arrangement 64a (e.g., electronic circuit board), electrical connector 68a, solenoid valve 50a, a protection mechanism 60a (e.g., air tight arrangement), and restrictors 58a that are shown to be optionally positioned upstream and/or downstream of (e.g., opposing or opposite sides) the solenoid valve 50a.

The automatic bleed valve arrangement 12a is embodied with similar design or structure as the automatic bleed valve arrangement 12 shown in FIGS. 1-9, although alternatives are possible.

Figure 11:
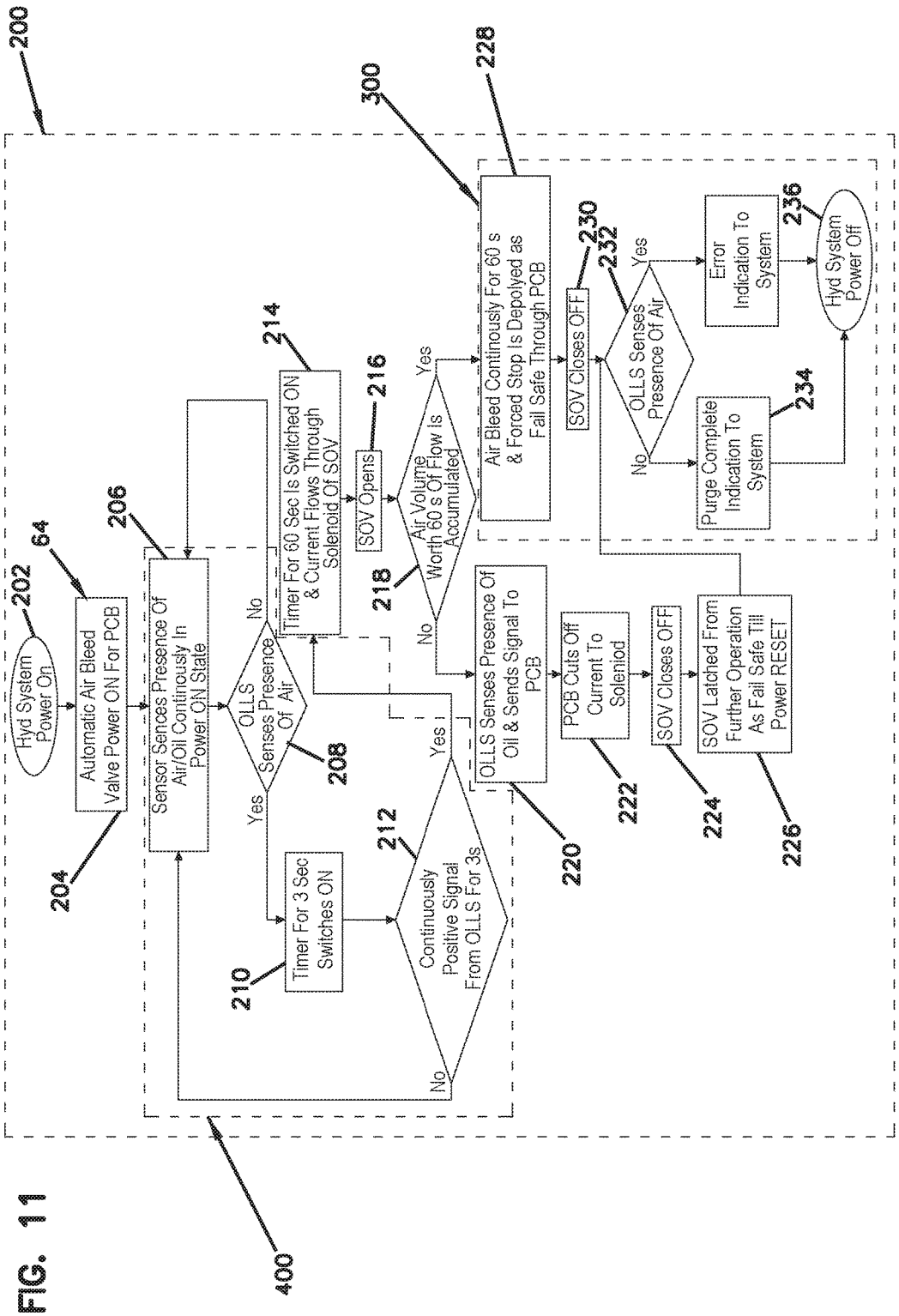
FIG. 11 is a schematic view of componentry of a presurized fluid system according to FIG. 1 and including a flow chart showing features for conducting a method of diagnostically operating the automatic bleed valve arrangement of the pressurized fluid system, in accord with selected principles of the present disclosure.

II. Diagnostically Operating an Automatic Bleed Valve Arrangement Associated in a Pressurized Fluid System for Evaluating Undesired Air Leakage; FIG. 11

A. Diagnosing Operation of Automatic Bleed Valve Arrangement

Another aspect of the present disclosure relates to a diagnostic operation of an automatic bleed valve arrangement in a pressurized system, such as for example, a hydraulic system. This can be done with electronic components now known or later developed, including through use of appropriate chips, printed circuit boards, control arrangements, etc. For example, an electronic controller can be used to conduct the diagnostic operation, which can include appropriate programming, such as, via printed circuit boards, chip systems, or other systems now known or later developed. The electronic controller includes appropriate programming with timers, other programming, etc. to conduct the diagnosis as reflected in the depicted and described flow chart, FIG. 11.

As used herein, the term, "diagnostically operating" and variants thereof, in this context, is meant to refer to operating an automatic bleed valve arrangement in a manner that diagnoses the presence of an undesired level of air leakage in a pressurized fluid system.

An approach to such diagnostic operation is to evaluate an amount of air that is released, during venting, from a pressurized fluid system. There are a variety of ways to evaluate an amount of air that is released during such venting. For example, one approach would be to directly measure the amount of air released from the system during venting. However, such a method might require external measuring equipment.

Another example approach to evaluating an amount of air released during venting is through use of a control arrangement or apparatus already present, that operates the automatic bleed valve arrangement, but modified as described. In such an example, the control arrangement operable with the automatic bleed valve arrangement is modified to perform the diagnostic operation such that no additional equipment beyond the control arrangement and their integration is necessary. For example, a method of performing the diagnosis described herein includes a step of opening an automatic bleed valve arrangement in the pressurized fluid system to vent for a predetermined amount of time, the time being at least sufficient to vent an amount of air from the pressurized fluid system that would be expected if properly operating; a step of closing the valve after the completion of the predetermined amount of time; and a step of evaluating whether an undesired amount of air remains in the pressurized fluid system after the step of closing the automatic bleed valve arrangement. That is, such a method involves a normal automatic bleed valve arrangement vent process followed by determination as to whether that process resulted in adequate venting. If it did not, it means that there is a greater source of air in the pressurized fluid system, which is indicative of a leak in the pressurized fluid system.

The present disclosure relates to a method of evaluating the pressurized fluid system 10, for example, hydraulic system, including the automatic bleed valve arrangement 12, for undesirable air leakage that can cause air entrapment in the pressurized fluid system 10. The method can include a step of diagnostically operating the automatic bleed valve arrangement 12. The step of diagnostically operating the automatic bleed valve arrangement 12 includes a step of evaluating an amount of air released form the pressurized fluid system 10 by operation of the automatic bleed valve arrangement 12, although alternatives are possible.

The step of diagnostically operating the automatic bleed valve arrangement 12 can include a step of 1) initial automatic bleed valve arrangement venting; and 2) a step of detecting whether an undesirable amount of air remains in the pressurized fluid system 10, after the step of initial automatic bleed valve arrangement 12 venting, although alternatives are possible. The step of detecting can be conducted within a selected time period $T_a$ of completion of the step of initial automatic bleed valve arrangement 12 venting.

As used herein, in this context, without more, $T_a$ can mean a time within which an indication of an undesirable amount of air in the pressurized fluid system 10, after the step of initial automatic bleed valve arrangement 12 venting, is indicative of an undesired leak in the pressurized fluid system 10.

The step of initial automatic bleed valve arrangement 12 venting can include a step of 1) opening the automatic bleed valve arrangement 12 and venting air through the automatic bleed valve arrangement 12, for a predetermined time $T_n$; and a step of 2) closing the automatic bleed valve arrangement 12 after the predetermined time $T_n$ has ended, although alternatives are possible.

As used herein, in this context, the predetermined time $T_n$ can at least be a time sufficient to selectively vent a desired amount of air accumulated within the pressurized fluid system 10 when properly operating. The predetermined time $T_n$ can be a selected time of at least 30 seconds, although alternatives are possible. The predetermined time $T_n$ can be a selected time of no more than 180 seconds, although alternatives are possible. The predetermined time $T_n$ can be a selected time within a range of 40 seconds to 170 seconds, inclusive, although alternatives are possible.

The method can further include a step of powering off the pressurized fluid system 10 after the step of detecting whether an undesirable amount of air remains in the pressurized fluid system 10, and a step of sending an error message to an equipment monitoring system (not shown) of the pressurized fluid system 10 when an undesirable amount of air is detected, although alternatives are possible. The step of sending the error message can be performed before the pressurized fluid system 10 is powered off, although alternatives are possible.

The step of diagnostically operating can include a step of venting air from the pressurized fluid system 10 by operation of the automatic bleed valve arrangement 12 after a step of confirmation of a sufficient amount of air in the pressurized fluid system 10 to warrant venting in avoidance of a false detection of a sufficient amount of air in the pressurized fluid system 10 to warrant venting, although alternatives are possible. The step of confirmation of a sufficient amount of air in the pressurized fluid system 10 to warrant venting in avoidance of a false detection of air can include a first check for a sufficient amount of air in the pressurized fluid system 10 to warrant venting; and, if the first check indicates a sufficient amount of air in the pressurized fluid system 10 to warrant venting, after the first check, further checking for a sufficient amount of air in the pressurized fluid system 10 within a selected period of time $T_s$.

As used herein, in this context, without more, $T_s$ can mean a time within which the further checking confirms the indication of the first check that there is a sufficient amount of air, to avoid the first check being interpreted falsely as a positive indication of a sufficient amount of air prior to opening the automatic bleed valve arrangement 12.

The step of further checking for sufficient air presence includes evaluating a level of fluid within the automatic bleed valve arrangement. The selected period of time $T_s$ can be a selected time of at least 1 second and no more than 4 seconds. The step of further checking can be a step of checking continuously after the first check.

B. Operation of Automatic Bleed Valve

Also, according to the present disclosure, a process of operating an automatic bleed valve arrangement in a pressurized fluid system to vent the pressurized fluid system is provided.

The present disclosure relates to a method of operating the automatic bleed valve arrangement 12 in the pressurized fluid system 10 to vent the pressurized fluid system 10, for example, a hydraulic system. The method includes a steps of: 1) confirmation of a sufficient amount of air in the pressurized fluid system 10 to warrant venting in avoidance of a false detection of a sufficient amount of air in the pressurized fluid system 10 to warrant venting; and 2) venting the pressurized fluid system 10 after the step of further checking when the further checking confirms the indication of the first check that there is a sufficient amount of air, although alternatives are possible. The step of confirmation of a sufficient amount of air in the pressurized fluid system 10 to warrant venting in avoidance of a false detection of air includes: (i) a first check for a sufficient amount of air in the pressurized fluid system 10 to warrant venting; and, (ii) if the first check indicates a sufficient amount of air in the pressurized fluid system 10 to warrant venting, after the first check, further checking for a sufficient amount of air in the pressurized fluid system 10 within a selected period of time $T_s$.

As used herein, in this context, without more, $T_s$ can mean a time within which the further checking confirms the indication of the first check that there is a sufficient amount of air, to avoid the first check being interpreted falsely as a positive indication of a sufficient amount of air prior to opening the automatic bleed valve arrangement.

The step of further checking can be a step of checking continuously after the first check. The selected period of time $T_s$ can be a selected time of at least 1 second and no more than 4 seconds.

The method can be conducted during a process of evaluating the pressurized fluid system 10, including the automatic bleed valve arrangement 12 therein, for undesirable air leakage that can cause air entrapment in the pressurized fluid system 10, by diagnostically operating the automatic bleed valve arrangement. The step of diagnostically operating the automatic bleed valve arrangement includes a step of evaluating an amount of air released from the pressurized fluid system 10 by operation of the automatic bleed valve arrangement 12. The step of diagnostically operating the automatic bleed valve arrangement can include a step of i) initial automatic bleed valve arrangement 12 venting; and ii) a step of detecting whether an undesirable amount of air remains in the pressurized fluid system 10 after the step of initial automatic bleed valve arrangement 12 venting, although alternatives are possible. The step of detecting can be conducted within a selected time period $T_a$ of completion of the step of initial automatic bleed valve arrangement 12 venting.

As used herein, in this context, without more, $T_a$ can mean a time within which an indication of an undesirable amount of air in the pressurized fluid system 10, after the step of initial automatic bleed valve arrangement 12 venting, is indicative of an undesired leak in the pressurized fluid system 10.

The step of initial automatic bleed valve arrangement 12 venting can include a step of opening the automatic bleed valve arrangement 12 and venting air through the automatic bleed valve arrangement 12, for a predetermined time $T_n$ and a step of closing the automatic bleed valve arrangement 12 after the predetermined time $T_n$ has ended.

As used herein, in this context, without more, the predetermined time $T_n$ can mean at least a time sufficient to selectively vent a desired amount of air accumulated within the pressurized fluid system 10 when properly operating.

Referring to FIG. 11, a schematic flow chart 200 is depicted illustrating a system with a control arrangement 64 configured to practice a method of diagnostically operating an automatic bleed valve arrangement 12 in a pressurized fluid system 10 in accord with the present disclosure.

The flow chart 200 includes an apparatus flow chart 300 configured for diagnostic operation of the automatic bleed valve arrangement 12. The flow chart 200 also includes an apparatus flow chart 400 configured for detection of sufficient air warranting venting including an arrangement for avoiding false positive detection. In general, the flow chart 200 shows what the control arrangement 64 is configured to control and what equipment the control arrangement 64 is configured to control. The equipment can be, for example, the equipment previously described.

Now referring to the flow chart 200 as a whole, this is typically used on a hydraulic system such as an airplane system, although alternatives are possible. FIG. 11 will be characterized in steps that would take place in a typical pressurized fluid system.

At operations 202, 204 the hybrid system and automatic bleed valve arrangement is powered on. Operation 206 is performed where the liquid level sensor 48 continuously monitors a presence of air/oil in the automatic bleed valve arrangement 12. Operation 208 is performed to determine whether the liquid level sensor 48 senses an initial presence of air in the automatic bleed valve arrangement 12. If a presence of air is not detected, the liquid level sensor 48 continuous to monitor the automatic bleed valve arrangement 12 for the presence of air. If a presence of air is detected, operation 210 is performed to switch on a timer for a predetermined period of time Ts.

Operation 212 is performed where the liquid level sensor 48 detects within a predetermined period of time Ts whether undesirable air presence remains in the pressurized fluid system 10. If a presence of undesirable air is sufficient to warrant venting, then operation 214 occurs to switch a timer on for selective period of time such that current flows through the solenoid valve 50.

At operation 216, the solenoid valve 50 opens. At operation 218, venting occurs for a selected period of time to accumulate air within the selected period of time. If there is not enough air accumulated during the selected period of time, operation 220 occurs where the liquid level sensor 48 senses a presence of liquid and send a signal to the control arrangement 64. At operation 222, the control arrangement 64 cuts off current to the solenoid valve 50. At operation 224, the solenoid valve 50 closes. As operation 226, the solenoid valve 50 is latched and inhibited from further operation as a fail-safe until power is reset.

If there is sufficient air accumulated at operation 218, then air is vented for a predetermined time Tn at operation 228, the predetermined time Tn can mean a time sufficient to selectively vent a desired amount of air accumulated within the pressurized fluid system 10 when properly operating. At operation 230, the solenoid valve 50 of the automatic bleed valve arrangement 12 closes.

At operation 232, the liquid level sensor 48 of the automatic bleed valve arrangement 12 determines whether a presence of air is detected. At operation 234, an indication of complete venting is provided and the pressurized fluid system 10 is powered off in operation 236. If a presence of air is detected, operation 238 is performed to indicate an error in the system and the pressurized fluid system is powered off in operation 236.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A method of evaluating a pressurized fluid system, including an automatic bleed valve arrangement therein, for undesirable air leakage; the method including:
   (a) a step of diagnostically operating the automatic bleed valve arrangement; wherein the step of diagnostically operating the automatic bleed valve arrangement comprises:
      (i) a step of initial automatic bleed valve arrangement venting; and
      (ii) a step of detecting whether an undesirable amount of air remains in the pressurized fluid system, after the step of initial automatic bleed valve arrangement venting; the step of detecting being conducted within a selected time period $T_a$ of completion of the step of initial automatic bleed valve arrangement venting;
         (A) $T_a$ being a time within which an indication of an undesirable amount of air in the pressurized fluid system, after the step of initial automatic bleed valve arrangement venting, is indicative of an undesired leak in the pressurized fluid system.

2. A method according to claim 1, wherein:
   (a) the step of diagnostically operating the automatic bleed valve arrangement comprises:
      (i) a step of evaluating an amount of air released from the pressurized fluid system by operation of the automatic bleed valve arrangement.

3. A method according to claim 1, wherein:
   (a) the step of initial automatic bleed valve arrangement venting includes:
      opening the automatic bleed valve arrangement and venting air through the automatic bleed valve arrangement, for a predetermined time $T_n$; the predetermined time $T_n$ at least being a time sufficient to selectively vent a desired amount of air accumulated within the pressurized fluid system when properly operating; and (b) closing the automatic bleed valve arrangement after the predetermined time $T_n$ has ended.

4. A method according to claim 3, wherein:
(a) the predetermined time $T''$ is a selected time of at least 30 seconds.

5. A method according to claim 3, wherein:
(a) the predetermined time $T''$ is a selected time of no more than 180 seconds.

6. A method according to claim 3, wherein:
(a) the predetermined time $T_n$ is a selected time within a range of 40 seconds to 170 seconds, inclusive.

7. A method according to claim 1, including:
(a) a step of powering off the pressurized fluid system after the step of detecting whether an undesirable amount of air remains in the pressurized fluid system.

8. A method according to claim 7, including:
(a) a step of sending an error message to an equipment monitoring system of the pressurized fluid system when an undesirable amount of air is detected.

9. A method according to claim 8, wherein:
(a) the step of sending the error message is performed before the pressurized fluid system is powered off.

10. A method according to claim 1, wherein:
(a) the step of diagnostically operating includes a step of venting air from the pressurized fluid system by operation of the automatic bleed valve arrangement after a step of confirmation of a sufficient amount of air in the pressurized fluid system to warrant venting in avoidance of a false detection of a sufficient amount of air in the pressurized fluid system to warrant venting; the step of confirmation of a sufficient amount of air in the pressurized fluid system to warrant venting in avoidance of a false detection of air comprising:
  (i) a first check for a sufficient amount of air in the pressurized fluid system to warrant venting; and,
  (ii) if the first check indicates a sufficient amount of air in the pressurized fluid system to warrant venting, after the first check, further checking for a sufficient amount of air to warrant venting in the pressurized fluid system within a selected period of time $T_s$;
    (A) $T_s$ being a time within which the further checking confirms the indication of the first check that there is a sufficient amount of air, to avoid the first check being interpreted falsely as a positive indication of a sufficient amount of air prior to opening the automatic bleed valve arrangement.

11. A method according to claim 10, wherein:
(a) the step of further checking for sufficient air presence includes evaluating a level of fluid within the automatic bleed valve arrangement.

12. A method according to claim 10, wherein:
(a) the selected period of time $T_s$ is a selected time of no more than 4 seconds.

13. A method according to claim 10, wherein:
(a) the selected period of time $T_s$ is a selected time of at least 1 second.

14. A method according to claim 10, wherein:
(a) the step of further checking is a step of checking continuously after the first check.

15. A method of operating an automatic bleed valve arrangement in a pressurized fluid system to vent the pressurized fluid system; the method comprising:

(a) a step of confirmation of a sufficient amount of air in the pressurized fluid system to warrant venting in avoidance of a false detection of a sufficient amount of air in the pressurized fluid system to warrant venting; the step of confirmation of a sufficient amount of air in the pressurized fluid system to warrant venting in avoidance of a false detection of air comprising:
  (i) a first check for a sufficient amount of air in the pressurized fluid system to warrant venting; and,
  (ii) if the first check indicates a sufficient amount of air in the pressurized fluid system to warrant venting, after the first check, further checking for a sufficient amount of air in the pressurized fluid system within a selected period of time $T_s$;
    (A) $T_s$ being a time within which the further checking confirms the indication of the first check that there is a sufficient amount of air, to avoid the first check being interpreted falsely as a positive indication of a sufficient amount of air prior to opening the automatic bleed valve arrangement; and,
(b) venting the pressurized fluid system after the step of further checking when the further checking confirms the indication of the first check that there is a sufficient amount of air;
wherein the method is conducted during a process of evaluating the pressurized fluid system, including the automatic bleed valve arrangement therein, for undesirable air leakage, by diagnostically operating the automatic bleed valve arrangement.

16. A method according to claim 15, wherein:
(a) the step of further checking is a step of checking continuously after the first check.

17. A method according to claim 15, wherein:
(a) the selected period of time $T_s$ is a selected time of no more than 4 seconds.

18. A method according to claim 15, wherein:
(a) the selected period of time $T_s$ is a selected time of at least 1 second.

19. A method according to claim 15, wherein:
(a) the step of diagnostically operating the automatic bleed valve arrangement comprises:
  (i) a step of evaluating an amount of air released from the pressurized fluid system by operation of the automatic bleed valve arrangement.

20. A method according to claim 15, wherein:
(a) the step of diagnostically operating the automatic bleed valve arrangement comprises:
  (i) a step of initial automatic bleed valve arrangement venting; and
  (ii) a step of detecting whether an undesirable amount of air remains in the pressurized fluid system after the step of initial automatic bleed valve arrangement venting; the step of detecting being conducted within a selected time period $T_a$ of completion of the step of initial automatic bleed valve arrangement venting;
    (A) $T_a$ being a time within which an indication of an undesirable amount of air in the pressurized fluid system, after the step of initial automatic bleed valve arrangement venting, is indicative of an undesired leak in the pressurized fluid system.

21. A method according to claim 20, wherein:
(a) the step of initial automatic bleed valve arrangement venting includes opening the automatic bleed valve arrangement and venting air through the automatic bleed valve arrangement, for a predetermined time $T''$; the predetermined time $T_n$ at least being a time sufficient to selectively vent a desired amount of air accumulated within the pressurized fluid system when properly operating; and
(b) closing the automatic bleed valve arrangement after the predetermined time $T_n$ has ended.

* * * * *